A. S. LANGILLE.
HOLDER.
APPLICATION FILED JULY 14, 1910.

981,773. Patented Jan. 17, 1911.

Witnesses:-

Inventor:
Allister S. Langille,
by Charles Turner Brown,
Atty.

THE NORRIS PETERS CO., WASHINGTON, D. C.

UNITED STATES PATENT OFFICE.

ALLISTER S. LANGILLE, OF CHICAGO, ILLINOIS.

HOLDER.

981,773.  Specification of Letters Patent.  Patented Jan. 17, 1911.

Application filed July 14, 1910. Serial No. 572,022.

*To all whom it may concern:*

Be it known that I, ALLISTER S. LANGILLE, a citizen of the United States, residing at Chicago, in the county of Cook and State of Illinois, have invented a new and useful Holder, of which the following is a specification.

This invention relates to a holder for cooking utensils and heating devices to be used principally with what are known as fireless cookers, and the object of the invention is to obtain a holder which can be placed in a chamber provided with cylindrical side walls without materially lessening the capacity of said chamber for containing cooking utensils or heating devices.

A further object of the invention is to obtain a holder of the kind named by means of which a cooking utensil may be placed directly over, under or between other cooking utensils or heating devices, and the heating of the walls of the chamber by conduction largely obviated.

A further object of the invention is to obtain a device on which cooking utensils of different heights may be placed, said holder being made adjustable to permit the same.

A further object of the invention is to obtain a light, durable and economically made holder of the kind described.

I attain these objects by the mechanism illustrated in the accompanying drawings, in which:—

Figure 1:
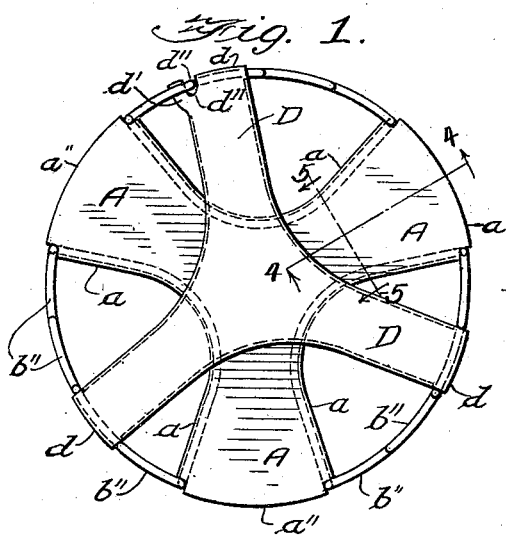
Figure 6:
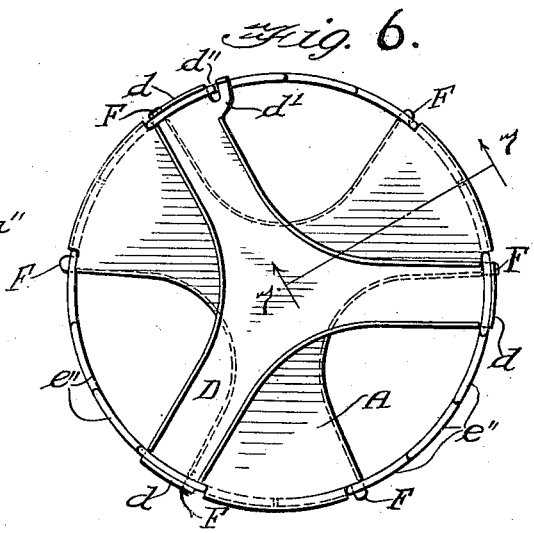
Figure 7:
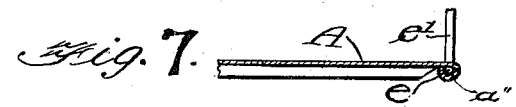
Figure 2:
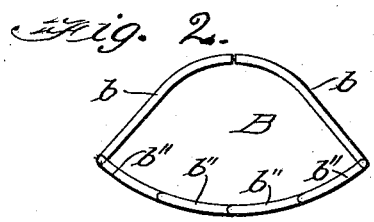
Figure 5:
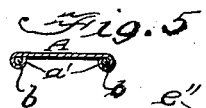
Figure 3:
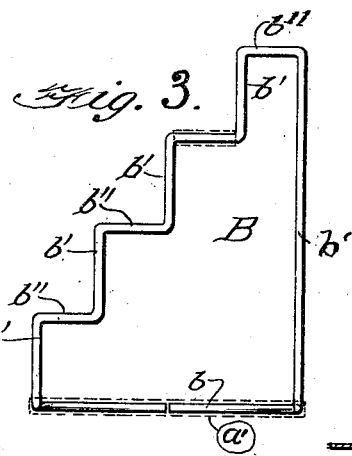
Figure 8:
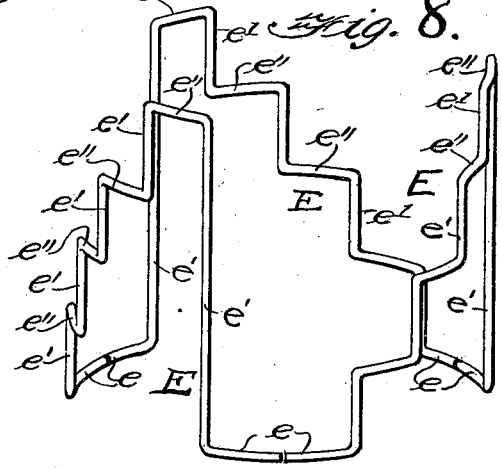
Figure 4:
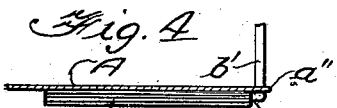

Figure 1 is a top plan view of a device embodying the invention. Fig. 2 is a top plan view of a bent wire support forming an element in said device. Fig. 3 is a side elevation of the bent wire support illustrated in Fig. 2. Fig. 4 is a vertical section of the device embodying the invention on line 4—4 of Fig. 1, viewed in the direction indicated by the arrows. Fig. 5 is a vertical section on line 5—5 of Fig. 1, viewed in the direction indicated by the arrows. Fig. 6 is a top plan view of a modification of the device embodying the invention. Fig. 7 is a sectional view on line 7—7 of Fig. 6, viewed in the direction indicated by the arrows, and Fig. 8 is a perspective of the bent wire supports forming elements in the modification illustrated in Fig. 6.

Similar letters refer to similar parts throughout the several views.

A is the base of the device.

$a, a, a$, are curved edges of base A.

B are supports made of wire bent to obtain the base $b$, perpendiculars $b'$ and horizontal $b''$. Bases $b$ of the supports B are curved to fit the edges $a$ of the base A, and said edges $a$ are turned over on said bases as shown at $a'$, Figs. 4 and 5, thereby firmly attaching the supports B to the base A. Bases $b$ being underneath the base A the body portion of said base A is thereby raised above the bed of the oven or chamber in which the device is placed, and free circulation of air underneath said base A may occur, said air flowing underneath said base and out therefrom by way of ends $a''$.

D is a metal support, provided with the turned down ends $d, d$, and the finger $d'$, with the space $d''$ between said finger and one of the ends $d$. Ends $d, d$, of the support E fit on the horizontals $b''$ of supports B, the perpendicular $b'$ which is adjacent to finger $d'$ being placed in space $d''$, and the turned down ends $d$ on the outside of the horizontals on which the support is placed. As thus constructed the support D may be placed on any one of the horizontals of a support B and on like horizontals of the remaining supports B, and thereby a table obtained on which a cooking utensil may be placed.

When the device is in the chamber of a device known as a fireless cooker a cooking utensil may be placed on the base A, the support D put in place as above described, and a second cooking utensil placed on said support D.

In the modification illustrated in Figs. 5, 6, and 7, the base A is provided with fingers F, F, and the supports E are duplicates, respectively bent up from a piece of wire, so as to obtain the bases $e$, perpendiculars $e'$ and horizontals $e''$. The bases $e$ fit the ends $a''$ of base A and said ends are turned over (or hemmed) on to said bases, with fingers F, F, on the outside of perpendiculars $e'$, thereby securing said support E to said base A. The support D is placed on the horizontals $e''$ in the same manner as it is placed on the horizontals $a''$. To raise the device out of a chamber, or to lift it from a table or other place, the support D may be placed bottom side up with the ends $d$ thereof underneath like horizontal of the supports B or as shown in Fig. 5, E, when by grasping said support D and raising it the whole device together with anything resting on the base A, will be raised with said support D.

To use the holder the support D hereinafter termed the additional base, may be placed on any set of the horizontal portions of the supports B, and a cooking vessel or utensil placed therein, a duplicate of the additional base may then be placed above the cooking utensil and an additional cooking utensil placed on said duplicate additional base, or a cooking utensil may be placed on the base A and an additional base (D) placed on the horizontal portion of the support B which is next above said cooking utensil. Or a heating device, as a hot stove or casting, may be placed on the base A, or on an additional base D, and a duplicate of said additional base placed above the heating device, with a cooking utensil thereon. Any number of the additional bases D may be used and the device placed in the chamber of a fireless cooker, and the order of placing articles thereon may be varied to suit the pleasure of the person using the same. The engagement of finger $d'$ of the support or additional base with perpendicular D prevents movement of said additional base in a horizontal plane, and in combination with turned down ends $d$ hold said additional base firmly in place on horizontals $b''$.

I claim:—

1. The combination of a base, a plurality of supports attached to said base, said supports respectively provided with bases and with a plurality of horizontal portions, corresponding horizontal portions of said supports in substantially the same horizontal plane, said bases of the supports curved and attached to the first named base by turning the outer edges of the first named base over on to the curved bases of the supports, and an additional base removably attachable to corresponding horizontal portions of the supports.

2. The combination of a base, a plurality of supports made of wire and respectively provided with bases and with a plurality of horizontal portions, a horizontal portion of one support in substantially the same plane as the corresponding horizontal portions of the remaining supports, said bases of the supports curved and attached to the first named base by turning the outer edges of the first named base over onto the curved bases of the supports, and an additional base removably attachable to the horizontal portions of the supports, with means to prevent lateral movement of said additional base on said horizontal portions.

3. The combination of a base, a plurality of supports made of wire and provided with bases and with a plurality of horizontal and perpendicular portions, said bases of the supports curved and attached to correspondingly curved edges of the first named base by turning said curved edges over onto the curved bases of the supports, and an additional base having ends fitting onto the horizontal portions of the supports, one of said ends provided with means engageable with one of said perpendicular portions of the suports to prevent lateral movement of said additional base.

4. The combination of a base, a plurality of supports, made of wire and provided with bases and with a plurality of horizontal and perpendicular portions, said bases of the supports curved and attached to the first named base by turning correspondingly curved edges of said first named base over onto the curved bases of the supports, and an additional base provided with a finger and with a plurality of turned down ends, said finger engageable with a perpendicular portion of one of said supports, and said turned down ends engageable with the horizontal portions of said supports.

5. The combination of a base having ends provided with projecting fingers, a plurality of supports made of wire and provided with bases and with a plurality of horizontal and perpendicular portions, said bases of the supports curved and attached to the first named base by turning correspondingly curved edges of said first named base over onto the curved bases of the supports, and held against longitudinal movement by said fingers, and an additional base provided with a finger and with a plurality of turned down ends, said finger engageable with a perpendicular portion of one of said supports, and said turned down ends engageable with the horizontal portions of said supports.

ALLISTER S. LANGILLE.

In the presence of—
CHARLES TURNER BROWN,
CORA A. ADAMS.